United States Patent [19]
Konno

[11] Patent Number: 5,645,268
[45] Date of Patent: Jul. 8, 1997

[54] LAYING AND TRANSPORTING APPARATUS

[76] Inventor: Kenichi Konno, c/o Kyowakogyo Co., Ltd., 22-20, Asahi-cho 1-chome, Atsugi-shi, Kanagawa 243, Japan

[21] Appl. No.: 525,798

[22] PCT Filed: Jan. 31, 1995

[86] PCT No.: PCT/JP95/00137

§ 371 Date: Sep. 26, 1995

§ 102(e) Date: Sep. 26, 1995

[87] PCT Pub. No.: WO95/21482

PCT Pub. Date: Aug. 10, 1995

[30]  Foreign Application Priority Data

Feb. 4, 1994 [JP] Japan ................... 6-043004
Jan. 18, 1995 [JP] Japan ................... 7-005734

[51] Int. Cl.[6] ............................................. B65H 59/00
[52] U.S. Cl. ........................... 254/134.4; 254/134.3 FT
[58] Field of Search ................ 254/134.3 R, 134.3 FT, 254/134.3 CL, 134.3 SC, 134.4, 134.5, 134.6, 134.7; 29/271, 272, 282

[56]  References Cited

U.S. PATENT DOCUMENTS

| | | | |
|---|---|---|---|
| 356,152 | 1/1887 | Munsie | 254/134.3 R |
| 447,350 | 3/1891 | Reilly | 254/134.3 R |
| 458,778 | 9/1891 | Reilly | 254/134.3 R |
| 521,125 | 6/1894 | Philips | 254/134.3 R |
| 524,789 | 8/1894 | Reilly | 254/134.3 R |
| 2,750,151 | 6/1956 | Fowler et al. | 254/134.3 FT |
| 3,869,784 | 3/1975 | Simpson | 29/272 |
| 4,185,809 | 1/1980 | Jonnes | 254/134.4 |
| 4,783,054 | 11/1988 | Morel et al. | 254/134.4 |
| 5,052,608 | 10/1991 | McClure | 29/272 |
| 5,173,010 | 12/1992 | Shimizu | |
| 5,360,291 | 11/1994 | Shimizu | 254/134.3 R |

FOREIGN PATENT DOCUMENTS

| | | |
|---|---|---|
| 469451 | 11/1950 | Canada . |
| 189054 | 9/1907 | Germany . |
| 58-95909 | 6/1983 | Japan . |
| 5-15023 | 1/1993 | Japan . |

*Primary Examiner*—Robert C. Watson
*Assistant Examiner*—Thomas W. Lynch
*Attorney, Agent, or Firm*—McAulay Fisher Nissen Goldberg & Kiel, LLP

[57]  ABSTRACT

There are provided a pipe (9) having a slit (6) along a longitudinal direction thereof throughout a full length thereof, a moving body (23) inserted into the pipe (9) and being movable in the pipe (9) by means of a compressed air fed into the pipe (9), and a connection member (1) comprising a wire, connected to the moving body (23) in the pipe (9) at a base end thereof, passing through the slit (6) and positioned outside the pipe (9) at a leading end thereof to which a material (15) to be laid or an object is connected. It is preferable that a sealing wire rod (8) which can blockade the slit (6) is arranged in the pipe (9) throughout the full length of the pipe, and that a guide groove (7) for guiding the sealing wire rod (8) so as to blockade the slit (6) at the time of movement of the moving body (23) is disposed on the moving body (23). The smaller number of persons can ensure the laying or transporting operation, and can reduce the laying or transporting time sharply compared with that in the prior art apparatuses. Also, the operator can be efficiently and safely ensured even if the course is located at the elevated spot and the complicated place.

12 Claims, 8 Drawing Sheets

LAYING AND TRANSPORTING APPARATUS

TECHNICAL FIELD

The present invention relates to an apparatus for laying a material to be laid such as a cable outside a pipe along the pipe, for transporting an object at a place where an inflammable substance such as an organic solvent and the like is treated and an electric motor cannot be used. More in detail, it relates to a laying or transporting apparatus of a cable or an object connected to a moving body by propelling the moving body in the pipe by means of a compressed air or a pulling wire.

BACKGROUND ART

Up to now, a cable etc. is entered into a laid pipe, and a compressed air or a bamboo is passed therethrough, so that the cable is laid in the pipe, However, according to this laying method, not only the cable etc. cannot be laid outside the pipe, but also a heavy cable such as a power electric wire and a control wire cannot be laid between the electric room in the construction and the electric equipments on the site. Up to now, in a case where such a heavy cable is said, a number of operators are distributed previously between the electric room and the electric equipments then the cable is transferred by the hands of the operators.

In the concrete, the operators are distributed every about 20 meters, then the first operator pulls the cable while taking a cable head on a leading end of the cable wound around a cable drum and transfers the cable head to the next operator which is distributed about 20 meters away, and the next operator pulls the cable while taking the cable head in the same way, and transfers it to further next operator. After the cable head passes through the laying place and the cable has been finished to be pulled to the destination, the cable is transferred to a predetermined position of racks and the like by the hands of all of the operators in time to the shout of the leader of the operators.

Therefore, a conventional laying operation requires a number of persons, also requires a long time of operation. In case where the laying operation is carried out at an elevated spot, a foothold is established, and then the operators must move on footing boards from a starting point to a terminal point of the cable, so that there are problems that the efficiency of the laying operation is poor, and that it is dangerous. Particularly, in a case where the object is laid on a complicated route which is bent up and down, right and left, there are many cases that not only the cable but also the equipments in the vicinity of the route are damaged.

It is, therefore, an object of the present invention to provide a laying or transporting apparatus in which a smaller number of persons are needed for the laying or transporting operation, and the laying or transporting time can be reduced compared with that in the prior art apparatus.

It is an another object of the present invention to provide a laying or transporting apparatus which can execute the laying or transporting operation efficiently and safely even on the elevated spot and the complicated place or course.

DISCLOSURE OF THE INVENTION

A construction of the present invention for attaining the above mentioned object will be described hereinafter.

Figure 1:
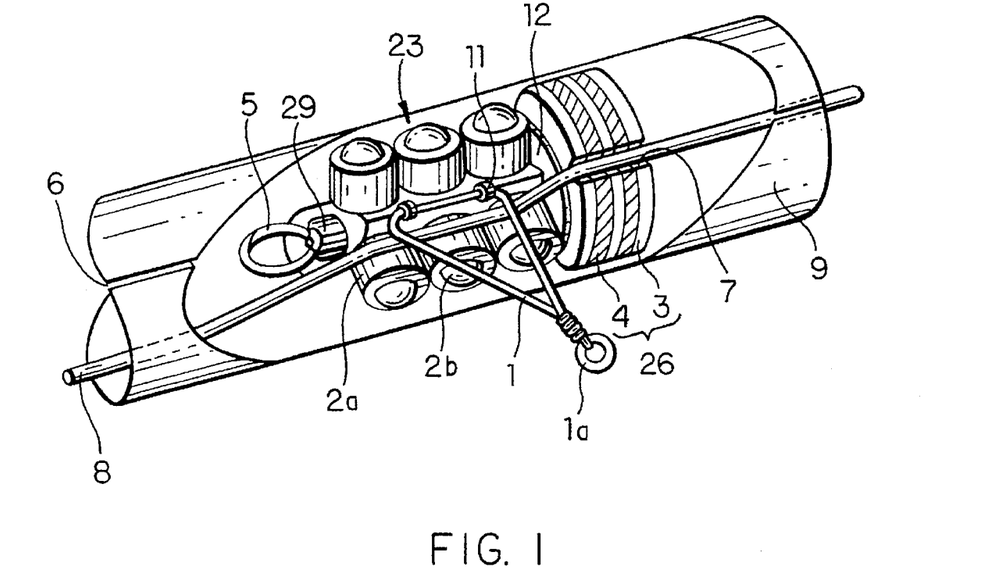
FIG. 1 is a perspective view of a first embodiment of the present invention, a main part of which is cut.
Figure 8:
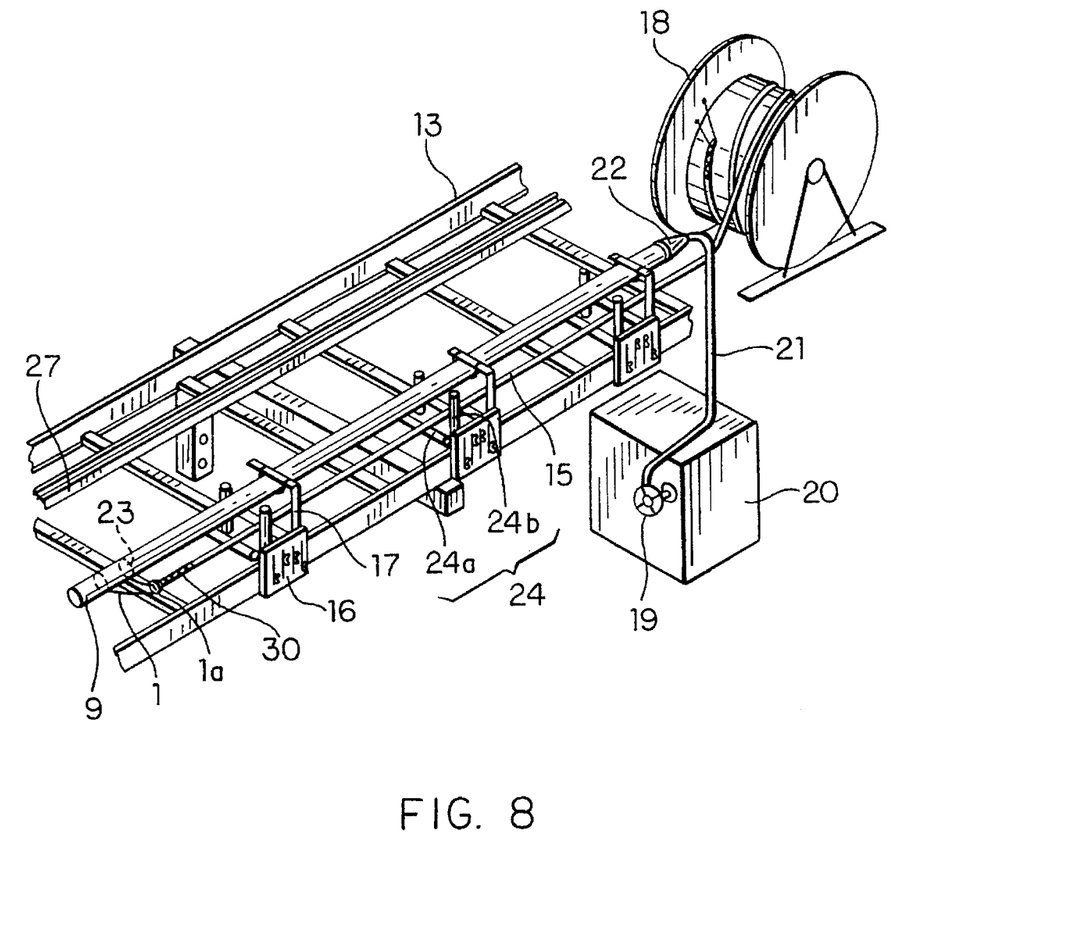
FIG. 8 is a perspective view showing a laying state of a cable according to the first embodiment of the present invention.

As shown in FIGS. 1 and 8, a laying or transporting apparatus which utilizes a compressed air, according to the present invention, comprises a pipe 9 having a slit 6 along a longitudinal direction thereof throughout a full length thereof, a moving body 23 inserted into the pipe 9 and being movable in the pipe 9 by means of a compressed air fed into the pipe 9, and a connection member 1 connected to the moving body 23 in the pipe 9 at a base end thereof, passing through the slit 6 and positioned outside the pipe 9 at a leading end thereof to which a material 15 to be laid (FIG. 8) such as a cable or an object is connected.

Moreover, it is preferable that a sealing wire rod 8 which can block the slit 6 is arranged in the pipe 9 throughout the full length of the pipe, and a guide groove 7 for guiding the sealing wire rod 8 so as to block the slit 6 at the time of movement of the moving body is disposed on the moving body 23.

The moving body 23 is inserted into the pipe 9, the connection member 1 is taken out of the slit 6, and the material 15 to be laid is connected to the leading end thereof. After that, the compressed air is introduced into the pipe 9, and then the moving body 23 is propelled, simultaneously the material 15 to be laid outside the pipe 9 is pulled and laid.

Figure 13:
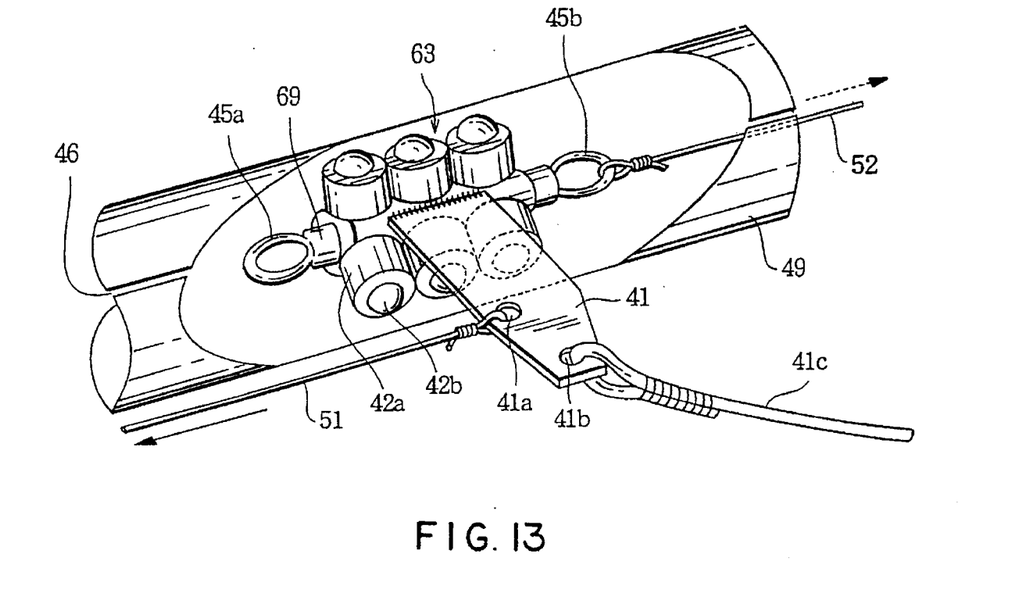
FIG. 13 is a perspective view of a fifth embodiment, a main part of which is cut.
Figure 14:
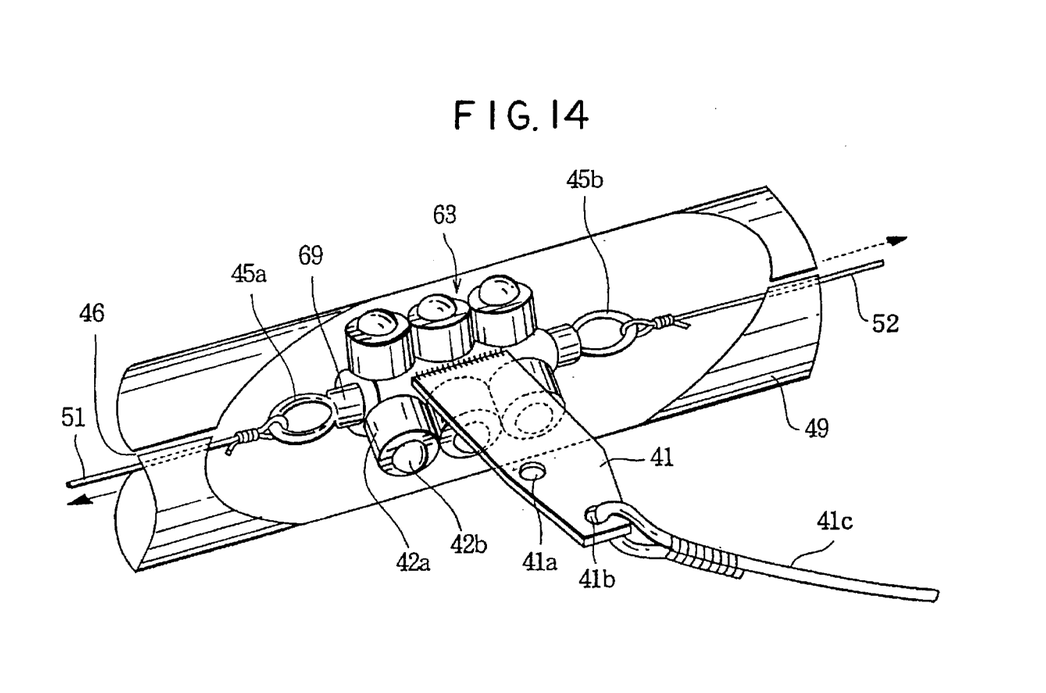
FIG. 14 is a perspective view of a sixth embodiment, a main part of which is cut.

As shown in FIGS. 13 and 14, a laying or transporting apparatus which utilizes a pulling wire, according to the present invention, comprises a pipe 49 having a slit 46 along a longitudinal direction thereof throughout a full length thereof, a moving body 63 inserted into the pipe 49 and being movable in the pipe 49, a connection member 41 connected to the moving body 63 in the pipe 49 at a base end thereof, passing through the slit 46 and positioned outside the pipe 49 at a leading end thereof to which a material 55 to be laid (FIG. 15) or an object is connected, and a first pulling wire 51 arranged along the pipe 49 from a terminal end of the pipe 49 and connected to the connection member 41.

Moreover, it is preferable that the apparatus comprises a second pulling wire 52 arranged along the pipe 49 from a starting end of the pipe 49 and connected to the moving body 63 in case of laying or transporting a plurality of materials to be laid or the objects.

The moving body 63 is inserted into the pipe 49 from the starting point of the pipe 49, the connection member 41 is taken out of the pipe through the slit 46. After that, the first pulling wire 51 is connected to the connection member 41 and further the material 55 to be laid is connected to the leading end thereof, When the first pulling wire 51 is pulled from the terminal end of the pipe 49, the moving body 63 is propelled, simultaneously the material 55 to be laid at an outside of the pipe is pulled, then the object is laid from the starting end to the terminal end of the pipe 49. When the second material to be laid (not shown in the Figures) is laid, the second pulling wire 52 is pulled and the moving body 63 is returned to the starting end of the pipe 49, and then the second material to be laid is laid similarly by pulling the first pulling wire 51.

BEST MODE FOR CARRYING OUT THE INVENTION

The embodiments of the present invention will be descried hereinafter with reference to the drawings.

As shown in FIGS. 1 to 4, a pipe 9 of the first embodiment is a pipe used for jet-pulling propulsion, is made of stainless steel and has a slit 6 along a longitudinal direction of the pipe throughout the full length of the pipe. A moving body 23 which is movable by a compressed air (jet-pulling) fed into the pipe is inserted into the pipe 9. A sealing wire rod 8 comprising a rubber wire having a circular section which can blockade the slit 6 is arranged in the pipe 9 throughout the full length of the pipe.

Figure 5:
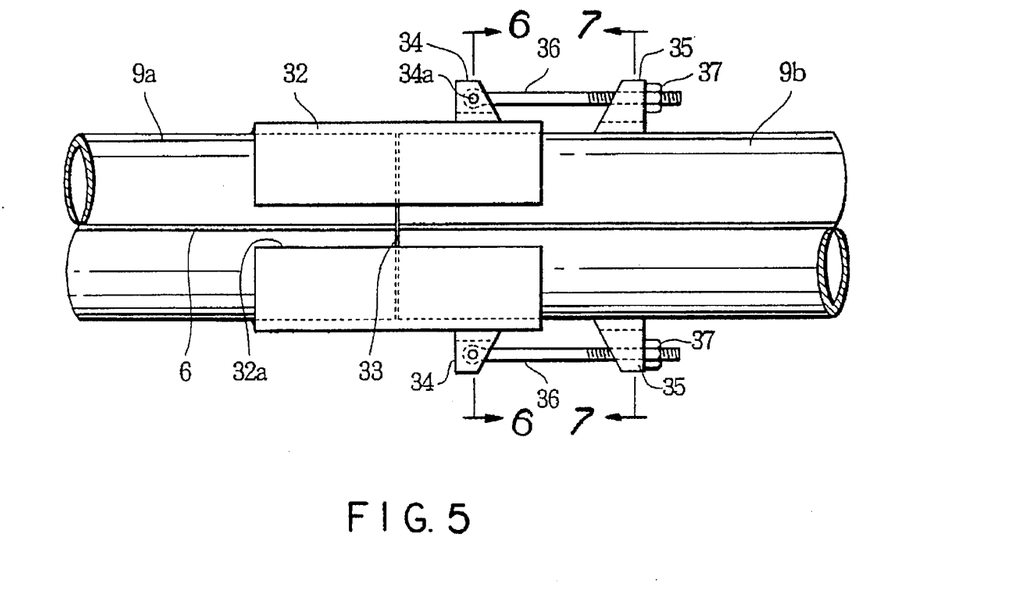
FIG. 5 is a side view showing a connecting state of pipes according to the first embodiment of the present invention.
Figure 6:
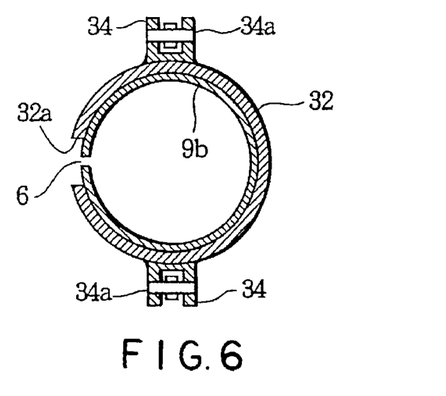
FIG. 6 is a sectional view taken along the line C—C of FIG. 5.
Figure 7:
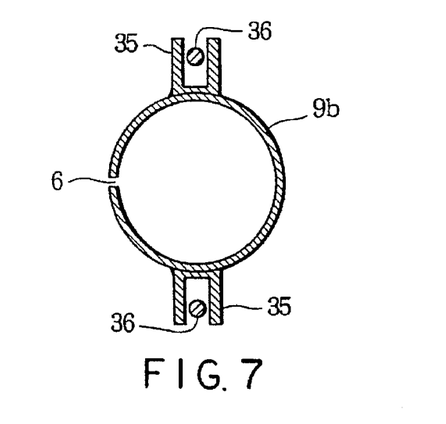
FIG. 7 is a sectional view taken along the line D—D of FIG. 5.

The pipes 9 are connected in plural corresponding to the laying distance of the cable. As shown in FIGS. 5 to 7, a leading end of the pipe 9a to be connected is connected to a base end of a connecting pipe 9b through a coupling pipe The coupling pipe 32 is adapted to block seam 33 of both of the pipes 9a, 9b while allowing the slits 6 of the pipe 9a to be connected and the connecting pipe 9b. In the concrete, the coupling pipe 32 has a slit 32a having a width wider than that of the slit 6, throughout the full length of the pipe. One end of the coupling pipe 32 is welded to the base end of the pipe 9a to be connected in such a manner that the slit 6 is positioned at a center of the slit 32a, and a pair of first pedestals 34 are disposed on an outer face of the other end of the coupling pipe 32. Also, a pair of second pedestals 35 are disposed on an outer face of the leading end of the connecting pipe 9b. The pedestals 34, 35 each is formed in U-like shape, and welded to the outer face of the pipe. A pin 34a is disposed on the first pedestals 34 in a direction perpendicular to the pipe, a base end of a screw 36 is attached pivotably to the pin 34a. The screw 36 has a length through which a leading end thereof reaches the second pedestals 35 in a state that the base end of the pipe 9a and the leading end of the pipe 9b are connected to each other. In order to connect both of the pipes 9a and 9b through the coupling pipe 32, the connecting pipe 9b is inserted into an open end of the coupling pipe 32 welded to the pipe 9a to be connected. The leading end of the screw 36 is entered between the second pedestals 35 in a state that both of the pipes 9a, 9b are connected to each other, then the screw 36 is disposed on both of the pedestals 34, 35, and then the nuts 37 are screwed. Both of the pipes 9a, 9b are fitted intimately by fastening the nut 37, and the gap is eliminated in the slit 33.

Moreover, a pair of the second pedestals 35 may be disposed on an outer face of the other end of the coupling pipe 32, a pair of the first pedestals 34 to which the base end of the screw 36 is attached pivotably may be disposed on the outer face of the leading end of the connecting pipe 9b.

Figure 2:
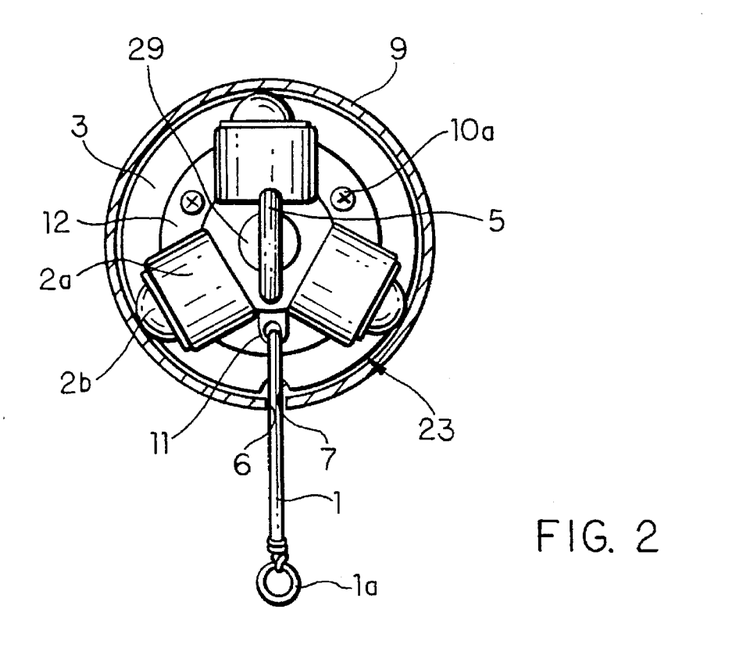
FIG. 2 is a sectional view taken along the line A—A of FIG. 3.

Returning to FIGS. 1 to 3, the moving body 23 has a center shaft 29 which coincides with a center of the pipe at an axis thereof. A ring 5 is fixed to a leading end of the center shaft 29, a number of bearing cases 2a are fixed to a center of the center shaft 29, and a sealing portion 26 is fixed to a base end of the center shaft 29. The ring 5 aims to pull a sealing wire rod 8 into the pipe 9 after the installing of the pipe 9. As shown in FIG. 2 in detail, in this example, the bearing cases 2a are arranged radially in rows of three in a center shaft direction at equi-angular distances of 120° with the center shaft 29 as a center, and total 9 pieces, 3 pieces per each row, are provided. Bearing balls 2b which can roll on an inner face of the pipe are contained in the bearing cases 2a.

Figure 3:
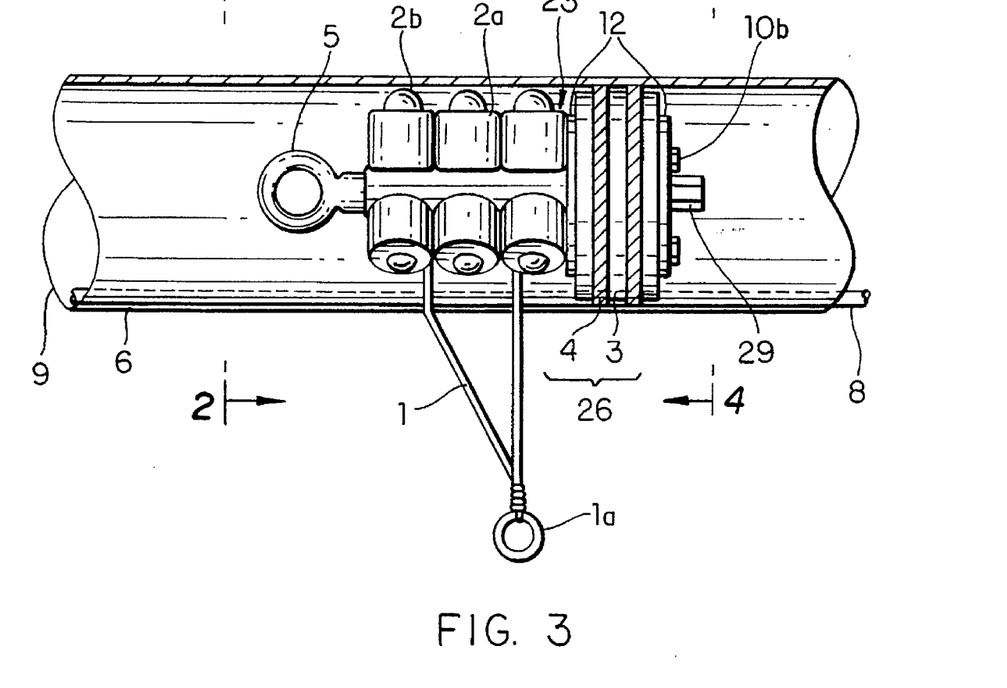
FIG. 3 is a side view of a moving body of the first embodiment of the present invention.

The sealing portion 26 has a plurality of synthetic rubbers 3 and sponges 4 each having an outer diameter corresponding to an inner diameter of the pipe 9 to form a composite plate, and is constituted by arranging steel plates 12 and screwing the nuts 10b to the bolts 10a penetrating through the composite plate. Thereby, the sealing portion 26 contacts to the inner face of the pipe 9 so as to maintain gas-tightness. A guiding groove 7 for guiding the wire rod formed in the longitudinal direction of the pipe 9 is formed on one part of the sealing portion 26. The guiding groove 7 has a width of an outer diameter of the sealing wire rod 8, and the sealing wire rod 8 is inserted into the guiding groove 7.

Two wire retaining rings 11 are fixed to a center of the center shaft 29 so as to be spaced apart from each other. A wire 1 as the connection member is passed through two of the rings 11, The wire 1 extends to an outside of the pipe 9 through the slit 6. A ring 1a for a connection with a cable head 30 ( FIG. 8) is attached to the leading end of the wire 1.

A method of using thus constructed laying apparatus of the first embodiment which utilizes the compressed air will be described hereinafter with reference to FIGS. 1 to 8.

Figure 4:
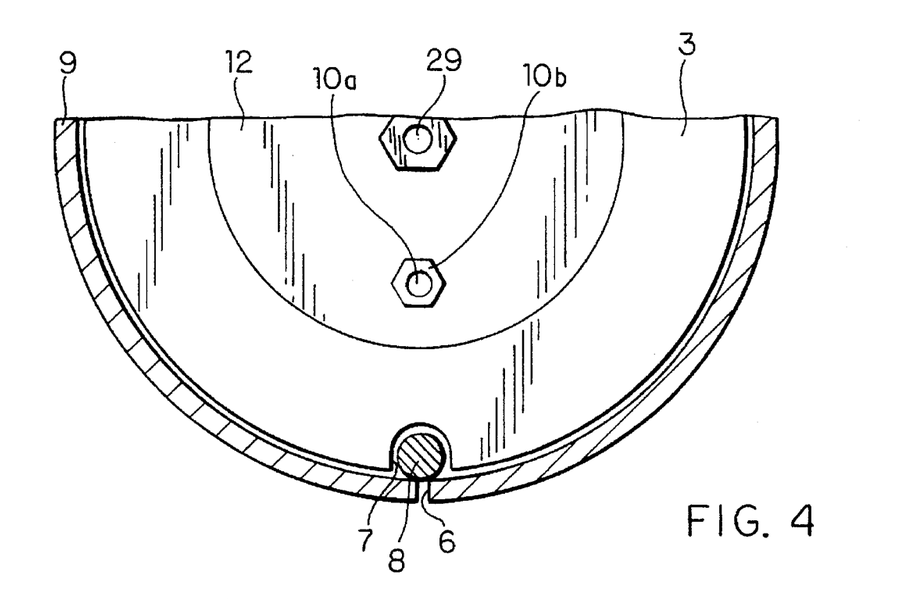
FIG. 4 is a sectional view of a main part taken along the line B—B of FIG. 3.

First, a number of guide rollers 24 are attached to a cable laying rack 13 through an attaching tool 16 at intervals of about 2 meters from a starting point to a terminal point of the cable laying. The guide roller 24 aims to pull the cable with a smaller resistance force, and comprises a pair of swingable horizontal rollers 24a and a pair of vertical rollers 24b spaced apart from each other. The horizontal rollers 24a and the vertical rollers 24b are adapted to rotate freely, respectively. Next, a number of pipes 9 are attached on the starting point to the terminal point of the cable laying through pipe holders 17 and attaching pieces 16 along the rack 13. Both of the pipes are connected to each other by the above mentioned coupling pipe 32. On this occasion, all of the pipes 9 are fitted in such a manner that the slits 6 are positioned at the lowermost position with respect to the section of the pipe as shown in FIGS. 2 to 4.

After all of the pipes 9 are fitted, a leading end of the sealing wire rod 8 is hung on the ring 5 of the moving body 23, the moving body 23 is inserted into the pipe 9 through the base end of the pipe 9 in a state that the sealing wire rod 8 is fitted into the guide groove 7 of the sealing portion 26. The ring 1a on the leading end of the wire 1 is taken out of the slit 6, and the moving body 23 is moved into the pipe 9 with the wire 1 taken by the hands of the operator. Thereby, the sealing wire rod 8 is inserted into the pipe 9 through the full length of the pipe. On the other hand, the heights of the guide roller 24 and the pipe 9 are adjusted by the attaching pieces 16. Reference numeral 27 denotes a cable laid on the rack 13.

Next, as shown in FIG. 8, the compressor 20 and the drum 18 around which the cable is wound are arranged in the vicinity of the base end of the pipe 9. The air hose 21 is connected to the compressor 20 through the air adjusting valve 19. The moving body 23 is inserted into the pipe 9 from the base end of the pipe 9 again, and the sealing wire rod 8 is fitted into the guide groove 7 and the ring 1a of the leading end of the wire 1 is previously taken out of the slit 6. After the cable head 30 on the leading end of the wire 1 is locked on the ring 1a, the leading end of the air hose 21 is connected to the base end of the pipe 9 through the coupling piece 22. In this embodiment, the cable 15 is an electric cable. When the air adjusting valve 19 is opened in this state and the compressed air of the compressor 20 is introduced into the pipe 9, the moving body 23 is propelled by a pressure of the compressed air.

When the moving body 23 is propelled, the wire 1 pulls the cable 15 through the cable head 30. That is, the wire 1 retained on the wire retaining ring 11 of the center shaft 29 shifts the sealing wire rod 8 from the slit 6, and then advances along a center of the slit 6. After the wire 1 passes therethrough, the guide groove 7 guides the sealing wire rod 8 toward the slit 6, and the sealing wire rod 8 contacts closely onto the slit 6. When the cable 15 is pulled, the cable 15 is drawn out of the drum 18 and laid on the guide rollers 24 with a small resistance force by the guide rollers 24. On this occasion, the drum 18 is rotated by the hand of the operator so as not to add the back tension onto the cable 15.

Even if the moving body 23 is pressed against the lower inner face of the pipe 9 due to the weight of the cable 15 at the time of pulling of the cable 15, the bearing balls 2b in rows of three bear equally and perpendicularly to the inner face of the pipe, so that the center shaft 29 of the moving body 23 is held in parallel with the longitudinal direction of the pipe 9. Thereby, synthetic rubbers 3 and the sponges 4 constituting the sealing portion 26 are not abraded partially, so that the sealing property of the sealing portion 26 is maintained high for a long time. Even after the moving body 23 passes therethrough, the sealing wire rod 8 seals the slit 6 by the compressed air on the pipe 9. The seam 33 between the pipes is sealed also by the coupling pipe 32 (FIG. 5). Due to these matters, the gastightness in the pipe 9 from the coupling piece 22 of the air hose 21 to the moving body 23 is increased, so that the compressed air does not leak outside the pipe. During the moving body 23 moves, the pressure of the air is maintained and the moving body 23 advances smoothly. The moving body 23 is accelerated by opening the air adjusting valve 19 gradually, then the cable 15 is pulled to the destination. When the cable 15 attached to the moving body 23 reaches the end, the operator on the end informs the operator on the start by the communicating means such as the telephone, then the air adjusting valve 19 is closed.

Figure 9:
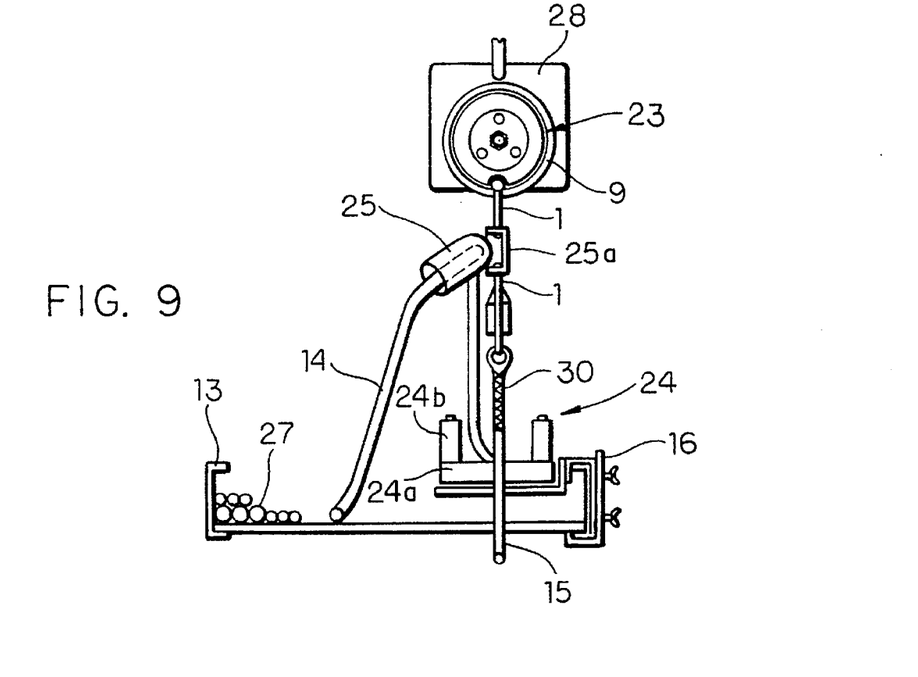
FIG. 9 is a front view showing a laying state of a cable according to a second embodiment.
Figure 10:
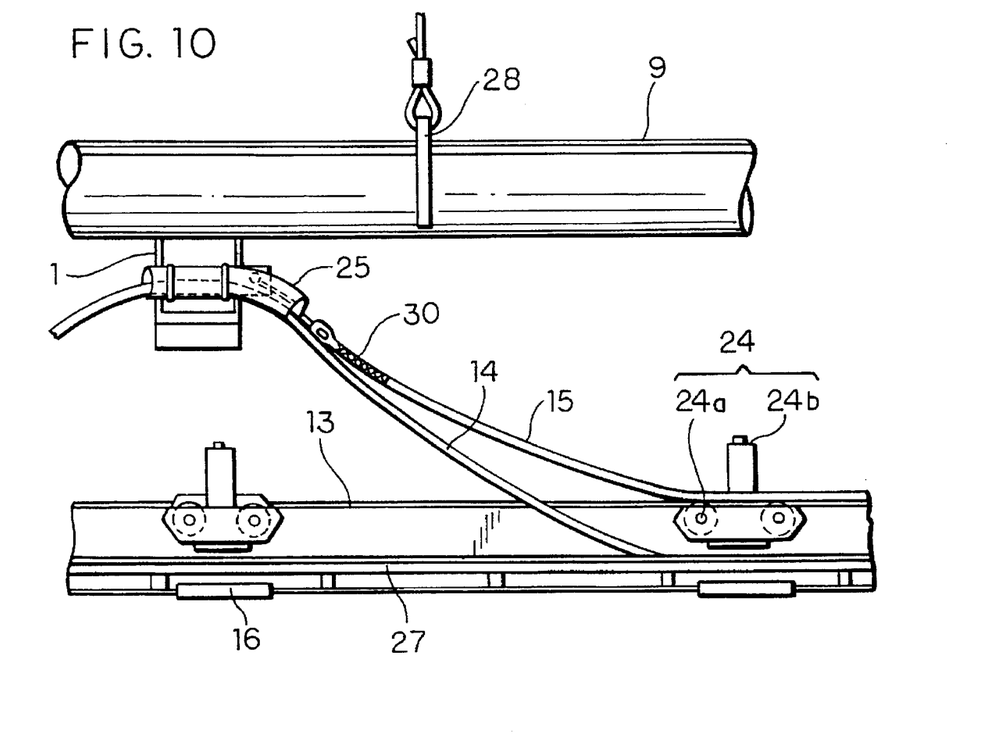
FIG. 10 is a side view showing a laying state of a cable according to the second embodiment.

FIGS. 9 and 10 show the second embodiment according to the present invention. In both of the drawings, the same reference numerals as the FIGS. 1 to 4 and FIG. 8 represent the same components. The characteristic feature An this embodiment resides in that the deflecting piece 25 is attached on the intermediate location of the wire 1 at the outside of the pipe 9. The deflecting piece 25 comprises a small pipe made of metal, and a base end of the small pipe is formed so as to be curved outward the guide rollers 24 as shown in FIG. 9. The deflecting piece 25 is attached to a channel 25a of U-like in section which is disposed on the intermediate location of the wire 1. Reference numeral 14 denotes an already laid cable, and 15 is a cable to be laid newly.

If the already laid cable 14 is placed on the guide rollers 24, the horizontal rollers 24a do not rotate, so that the pulling resistance of the second cable 15 to be laid next becomes large. Therefore, after the pipe 9 is held by the holding plate 28, first the already laid cable 14 is inserted through the deflecting piece 25, next, the cable head 30 of the cable 15 to be laid newly is locked on the leading end of the wire 1 similarly to the above mentioned embodiment, and the compressed air is introduced into the pipe 9 similarly to the above mentioned embodiment. The moving body 23 is propelled due to the compressed air, first the already laid cable 14 is disengaged from the guide rollers 24 by the deflecting piece 25 and laid directly on the rack 13, so that the guide rollers 24 turn out to be capable of rotating freely. In this state, next, a new cable 15 is laid on the guide rollers 24. Although there are not shown in the drawings, when the third cable is laid, the cable 15 is locked on the deflecting piece 25, and laid in the same way.

Figure 11:
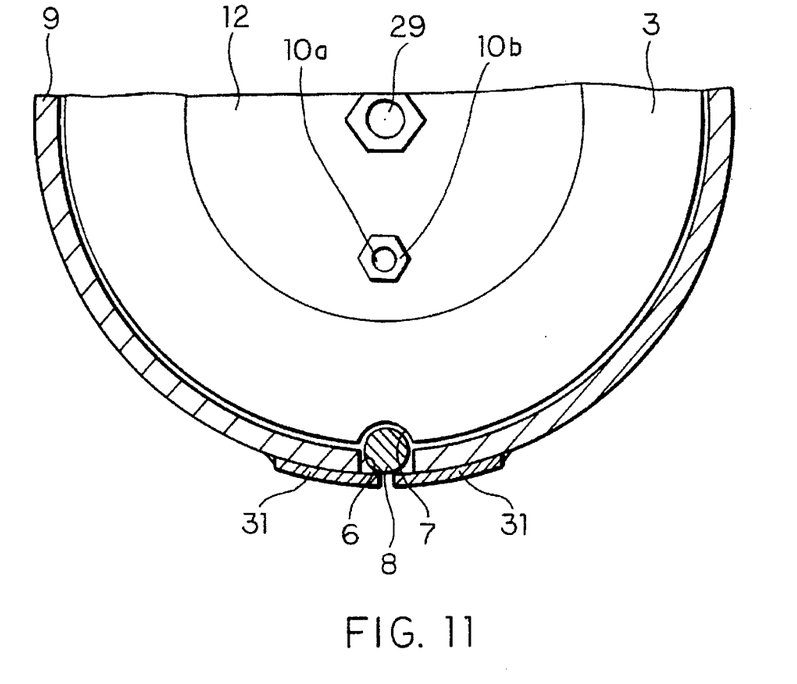
FIG. 11 is a sectional view showing a sealing state of a sealing wire rod of a third embodiment, corresponding to FIG. 4.

FIG. 11 shows the third embodiment. In FIG. 11, the same reference numerals as those of FIG. 4 represent the same components. The characteristic feature of this embodiment resides in that the slot 6 has a width corresponding to an outer diameter of the sealing wire rods 8, and that a slit covering plate 31 which narrows the width of the slot 6 is welded to an outer face of the pipe 9. In this example, the plate 31 is welded thereto front both sides of the slit 6 throughout the full length of the plate 31.

Thereby, when the moving body 23 is propelled by the compressed air after the sealing wire rod 8 is passed through the pipe 9, the sealing wire rod 8 is dropped into the slit by the guide groove 7, accordingly the sealing wire rod 8 turns out to be disengaged from the slit 6 even if the pipe 9 is curved.

Figure 12:
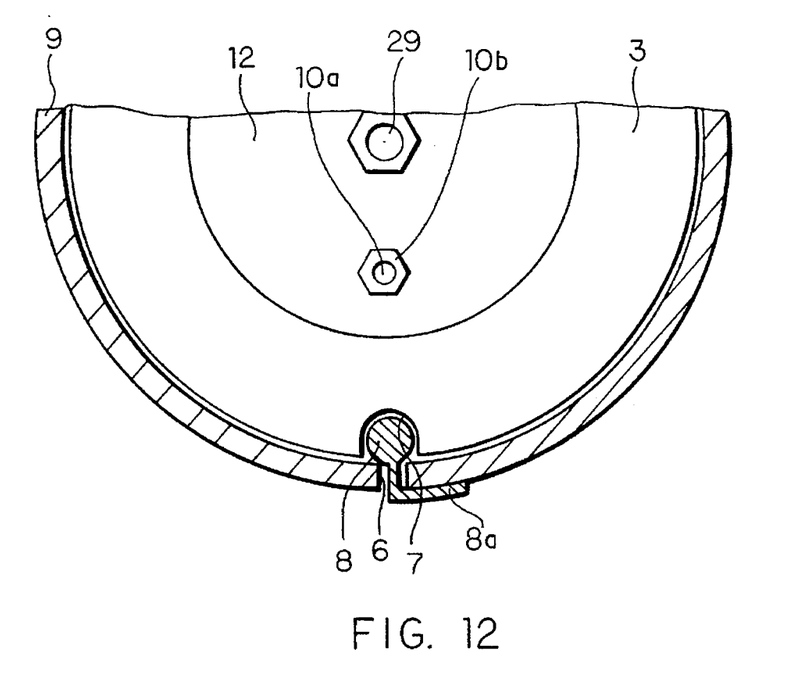
FIG. 12 is a sectional view showing a sealing state of a sealing wire rod of a fourth embodiment, corresponding to FIG. 4.

FIG. 12 shows a fourth embodiment. In FIG. 12, the same reference numerals as those of FIG. 4 represent the same components. The characteristic feature of this embodiment resides in that a locking portion 8a which is locked on the slit 6 is disposed on the sealing wire rod 8. This locking portion 8a is flat rubber which is L-like in section, and formed integrally at the time of extrusion-molding of the wire rod 8 made of rubber which is circle in section.

As shown in FIG. 12, the locking portion 8a is locked on one end edge of the slit 6, so that the sealing wire rod 8 turns out not to be separated front the slit 6 even if the locking portion 8a serves as an anchor and then the pipe 9 is curved.

Figure 15:
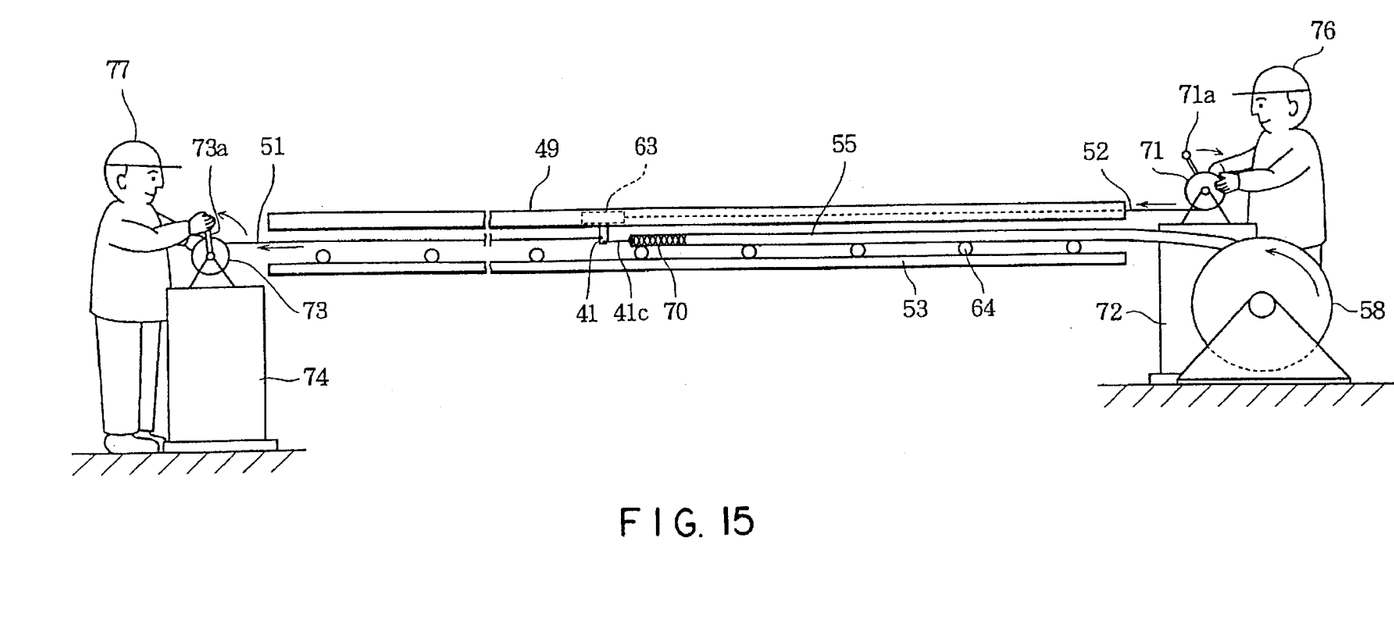
FIG. 15 is a side view showing a laying state of a cable according to the fifth embodiment.

FIG. 13 and FIG. 15 show a laying apparatus which utilizes the pulling wire of a fifth embodiment. As shown in FIG. 13 and FIG. 15, the pipe 49 of the fifth embodiment is made of plastic, and has a slit 46 in the longitudinal direction throughout the full length of the pipe similarly to the pipe 9 of the first embodiment. A moving body 63 which is movable in the pipe is inserted inside the pipe 49. The moving body 63 has a center shaft 69 which coincides with a center of the pipe at a center axis thereof. Rings 45a and 45b are fixed to both ends of the center shaft 69, and a number of bearing cases 42a are fixed to the center of the center shaft 69. The bearing cases 42a are disposed radially in rows of three in a center shaft direction at equi-angular distances of 120° with the center shaft 69 as a center, and total 9 pieces, 3 pieces per each row, are provided. Bearing bails 42b which can roll on an inner face of the pipe are contained in the bearing cases 42a.

A base end of a metal plate 41 which is a connection member is welded to the center of the center shaft 69. The plate 41 extends outside the pipe 49 through the slit 46. Holes 41a and 41b are disposed on a center and a leading end of the plate 41 outside the pipe. The hole 41a aims to hang a first pulling wire 51 comprising a fishing line or a thin metal wire, and the hole 41b aims to hang a wire 41c for connecting a cable head 70 (FIG. 15). Also, a ring 45b in the pipe aims to hang a second pulling wire 52 comprising a fishing line or a thin metal wire. As shown in FIG. 15, the first pulling wire 51 is wired along the pipe 49 from the terminal end of the pipe 49 which is the end of the cable laying, and the second pulling wire 52 is wired in the pipe from the start end of the pipe 49 which is the starting point of the cable laying.

A method of using the laying apparatus which utilizes thus constituted fifth embodiment will be described hereinafter with reference to FIGS. 13 and 15.

First, a number of guide rollers 64 are attached at regular intervals to a rack 53 which lays the cable similarly to the first embodiment. Next, the pipe 49 is laid along the rack 53 from the starting point to the terminal point of the cable laying through the pipe holders and attaching pieces in such a manner that the slits 46 thereof are positioned at the lowermost in the direction of the pipe. After the pipe 49 is fitted, a reel 71 of the second pulling wire 52 is disposed on a base 72 in the vicinity of the start end of the pipe 49, and also a reel 73 of the first pulling wire 51 is disposed on a base 74 in the vicinity of the terminal end of the pipe 49. A leading end of the pulling wire 52 drawn out of the reel 71 is hung on the ring 45b of the moving body 63, and the moving body 63 is inserted thereto from the start end of the pipe 49. On this occasion, the plate 41 is previously taken out of the slit 46. Next, the leading end of the pulling wire 51 drawn out of the reel 73 is hung on the hole 41a of the plate 41, then a cable head 70 of the cable 55 is connected to the hole 41b of the plate 41 through the wire 41c.

An operator 77 winds the pulling wire 51 on the reel 73 by rotating a handle 73a, then the moving body 63 is propelled by the pulling wire 51. Thereby, the plate 41 pulls the cable 55 through the cable head 70. The cable 55 is drawn out of a drum 58 arranged in the vicinity of the start end of the pipe 49. When the second cable is laid after the first cable 55 is laid, the operator 76 pulls the pulling wire 52 on the reel 71 by rotating the handle 71a to move the moving body to the start end of the pipe 49 again. Hereinafter, the second wire is laid by connecting a new cable head to the wire 41c similarly to the first cable.

FIG. 14 shows a laying apparatus which utilizes the pulling wire of the sixth embodiment. The characteristic construction in this example resides in that the first pulling wire 51 is hung on the wing 45a on the leading end of the center shaft 69 instead of the hole 41a of the plate 41. Thereby, since the pulling wire 51 is positioned in the pipe during pulling, there can be decreased the abrasion or the contamination of the pulling wire 51.

In order to lay the cable by this apparatus, the operator takes the plate 41 going out of the slit 46 by the hand to move the moving body 63 upto the terminal end of the pipe 49. Next, when the moving body 63 appears at the terminal end of the pipe 49, the pulling wire 51 is hung on the ring 45a and the reel 71 (FIG. 15) is rotated, then the moving body 63 is returned to the start end of the pipe 49. At this location, the cable head 70 is connected to the plate 41. Next, the cable is said by rotating the reel 73.

Since the pipe 49 is made of plastic and the compressor is not utilized in the fifth and sixth apparatuses, these apparatuses have an advantage that the cable can be laid with ease and with low cost compared with the first to fourth apparatuses.

Moreover, although the wire is explained as the connection member in the first embodiment, the connection member may be a metal plate having a thickness which can pass through the slit, as shown in the fifth embodiment.

Also, although the apparatus for laying the electric wire is explained in the first to the sixth embodiments, the present invention is not limited thereto, and can be used for the laying apparatus for the other pulling cable and the wire rod and the like. Also, the present invention can be applied for an apparatus for carrying by the compressed air an object at a place where an inflammable substance such as an organic solvent is treated and an electric motor cannot be used.

Also, the second pulling wire 52 of the fifth and the sixth embodiments may be hung on the plate 41, and the pipes of the fifth and the sixth embodiments may be made of stainless steel.

Also, if a plurality of pipes are fitted, the object can be moved over a wide range, an a plurality of the objects can be carried at any intervals.

Further, if the apparatus according to the present invention is arranged, the object can be moved on the complicated route even the place where the rails cannot be equipped, so that the use is wide extremely.

As described above, according to the present invention, the moving body is inserted into the pipe, the wire connected to the moving body is taken out of the pipe, the material to be laid and the object is connected to the leading end of the wire, the moving body is propelled by utilizing the compressed air or the pulling wire, and the material to be laid or the object outside of the pipe is laid or carried along the pipe. Accordingly, the smaller number of persons can carry out the laying or transporting operation, and can reduce the laying or transporting time sharply compared with that in the prior art apparatuses.

Also, if the pipe is previously arranged corresponding to the laying place or the transporting course, the operation can be efficiently and safely ensured even if the course is located at the elevated spot and the complicated place.

INDUSTRIAL APPLICABILITY

The laying or transporting apparatus according to the present invention is useful to lay the cable, or transports an object at a place where an inflammable substance such as an organic solvent is treated and an electric motor cannot be used.

I claim:

1. A laying or transporting apparatus comprising:
    a pipe (9) having a slit (6) along a longitudinal direction thereof throughout a full length thereof;
    a sealing wire rod (8) which can block the slit (6) is arranged in the pipe (9) throughout the full length of the pipe;
    a moving body (23) inserted in the pipe (9) and being movable in the pipe (9) by means of compressed air fed into the pipe (9) said moving body comprising a center shaft (29 which coincides with a center of the pipe at a shaft center thereof, a sealing portion (26) in gastight contact with an inner face of the pipe (9) and fixed to the center shaft (29), a guide groove (7) formed on the sealing portion (26) in a longitudinal direction of the pipe (9) for guiding the wire rod, a plurality of bearing cases (2a) fixed radially on the center shaft (29), and a plurality of bearing balls (2b) contained in the bearing cases (2a) and being capable of rolling on an inner face of the pipe (9); and a connection member (1) connected to the moving body (23) in the pipe (9) at a base and thereof, passing through the slit (6) and positioned outside the pipe (9) at a leading and thereof to which a material (15) to be laid or an object is connected.

2. The apparatus according to claim 1, wherein a sealing wire rod (8) which can block the slit (6) is arranged in the pipe (9) throughout the full length of the pipe.

3. The apparatus according to claim 2, wherein the slit (6) has a width corresponding to an outer diameter of the sealing wire rod (8), a slit covering plate (31) which narrows a width of the slit (6) is welded on an outer face of the pipe (9).

4. The apparatus according to claim 2, wherein a locking portion (8a) locked on the slit (6) is disposed integrally on the sealing wire rod (8).

5. The apparatus according to claim 1, wherein a guide groove (7) for guiding a sealing wire rod (8) so as to block the slit (6) at the time of movement of the moving body (23) is disposed on the moving body (23).

6. The apparatus according to claim 5, wherein the slit (6) has a width corresponding to an outer diameter of the sealing wire rod (8), a slit covering plate (31) which narrows a width of the slit (6) welded on an outer face of the pipe (9).

7. The apparatus according to claim 5, wherein a locking portion (8a) locked on the slit (6) is disposed integrally on the sealing wire rod (8).

8. The apparatus according to claim 5, wherein the moving body (23) comprises a center shaft (29) which coincides with a center of the pipe at a shaft center thereof, a sealing portion (26) contacting gastightly to an inner face of the pipe (9) and fixed to the center shaft (29), a guide groove (7) formed on the sealing portion (26) in a longitudinal direction of the pipe (9) for guiding the wire rod, a plurality of bearing cases (2a) fixed radially on the center shaft (29), and a plurality of bearing balls (2b) contained in the bearing cases (2a) and being capable of rolling on an inner face of the pipe (9).

9. The apparatus according to claim 1, wherein the material (14, 15, 27) to be laid is a cable.

10. The apparatus according to claim 9, which lays a first cable (14) on guide rollers (24), then newly lays a second cable (15) on the guide rollers (24), wherein the second cable (15) is connected to a leading end of the connection member (1) positioned outside the pipe (9), and a deflecting tool (25) engaging with the first cable (14) and disengaging the first cable (14) from the guide rollers (24) to move it to a predetermined laying position is attached on the intermediate portion of the connection member (1) positioned outside the pipe (9).

11. The apparatus according to claim 11, wherein a leading end of a connecting pipe (9b) is connected to a base end of a pipe to be connected (9a) through a coupling pipe (32) having a coupling pipe slit (32a) of a greater width than the slit (6), and the coupling pipe (32) is adapted to block the seam (33) at the connection of the connecting pipe (9b) to the pipe to be connected (9a).

12. The apparatus according to claim 11, wherein one end of the connecting pipe (32) is welded to the base end of the pipe (9a) to be connected or the connecting pipe (9b), first pedestals (34) are disposed on an outer face of the other end of the coupling pipe (32), second pedestals (35) are disposed on outer faces of leading ends of the connecting pipe (9b) or the pipe (9a) to be connected, base ends of a screw (36) are attached pivotably to the first pedestal (34) or the second pedestal (35), and screws (36) are disposed between both of the pedestals (34, 35) by connecting a leading end of the screw (36) to the other of the second pedestal (35) or the first pedestal (34).

* * * * *